(12) United States Patent
Sato

(10) Patent No.: US 8,665,531 B2
(45) Date of Patent: Mar. 4, 2014

(54) ZOOM LENS

(71) Applicant: Canon Kabushiki Kaisha, Tokyo (JP)

(72) Inventor: Arata Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/675,958

(22) Filed: Nov. 13, 2012

(65) Prior Publication Data

US 2013/0120852 A1    May 16, 2013

(30) Foreign Application Priority Data

Nov. 15, 2011    (JP) ................................. 2011-249337

(51) Int. Cl.
*G02B 15/14* (2006.01)
*G02B 15/173* (2006.01)

(52) U.S. Cl.
CPC ................................... *G02B 15/173* (2013.01)
USPC ........................................... 359/683; 359/676

(58) Field of Classification Search
USPC .................................. 359/676, 683, 686–692
See application file for complete search history.

(56) References Cited

FOREIGN PATENT DOCUMENTS

| JP | 2006-349947 A | 12/2006 |
|---|---|---|
| JP | 2007-298555 A | 11/2007 |

*Primary Examiner* — Jack Dinh
(74) *Attorney, Agent, or Firm* — Canon USA Inc. IP Division

(57) ABSTRACT

A zoom lens includes, from the object side, a first lens unit having a positive refractive power, a second lens unit having a negative refractive power, and a subsequent lens unit. The first lens unit includes an optical element composed of an anomalous dispersion optical material, a positive lens, and a negative lens. The shape of the negative lens and the ratio of the Abbe number of the positive lens and the Abbe number of the negative lens satisfy predetermined conditions.

4 Claims, 13 Drawing Sheets

ZOOM LENS

BACKGROUND OF THE INVENTION

1. Field of the Invention

The present invention relates to a zoom lens used in a liquid crystal projector, a silver halide camera, a digital single reflex camera, and the like.

2. Description of the Related Art

It is known that an optical system that has telephoto zooming ability and whose basic aberrations are adjusted can be obtained by arranging a first lens unit having a positive refractive power, a second lens unit having a negative refractive power, and subsequent lens units. In general, in optical systems, it is difficult to achieve a small size and a high performance. In particular, with an optical system having the aforementioned refractive power structure, it is difficult to achieve a small size while correcting axial chromatic aberration and transverse chromatic aberration at the telephoto end. Regarding such a problem, Japanese Patent Application Laid-Open No.: 2006-349947 and Japanese Patent Application Laid-Open No.: 2007-298555 describe optical systems whose axial chromatic aberration and transverse chromatic aberration may be corrected by using an anomalous dispersion material. With the optical systems described in Japanese Patent Applications Laid-Open Nos. 2006-349947 and 2007-298555, axial chromatic aberration and transverse chromatic aberration are corrected by using an anomalous dispersion material having a positive refractive power and a high partial dispersion ratio in a first lens unit.

With the optical systems described in Japanese Patent Applications Laid-Open Nos. 2006-349947 and 2007-298555, the correction of axial chromatic aberration and transverse chromatic aberration may be acceptable for certain applications. However, a higher image quality is required for digital single-lens reflex (DSLR) cameras and the like, and therefore further improvement in optical performance is required for such apparatuses.

SUMMARY OF THE INVENTION

According to an aspect of the present invention, a zoom lens includes, from an object side, a first lens unit having a positive refractive power, a second lens unit having a negative refractive power, and a subsequent lens unit. The first lens unit includes an optical element composed of an anomalous dispersion optical material, a positive lens, and a negative lens. The following conditional expressions are satisfied:

$$100 < \frac{vdp * fp}{\Delta\theta_{g,Fp} * \sqrt{fw \times ft}} < 1200 \quad (1)$$

$$-10.0 < (R2n + R1n)/(R2n - R1n) < -3.3 \quad (2)$$

$$2.8 < vdp1/vdn < 6.0, \quad (3)$$

where fw is a focal length of the entire zoom lens at a wide angle end, ft is a focal length of the entire zoom lens at a telephoto end, fp is a focal length of the optical element composed of the anomalous dispersion optical material, $\theta_{g,Fp}$ is a partial dispersion ratio of the anomalous dispersion optical material, $\Delta\theta_{g,Fp}$ is $\theta_{g,Fp} - (-0.001682 \times vdp + 0.6438)$, vdp is an Abbe number of the anomalous dispersion optical material, vdp1 is an Abbe number of a positive lens having the highest power in the first lens unit, vdn is an Abbe number of a negative lens having the highest power in the first lens unit, R1n is a radius of curvature of an object-side surface of the negative lens having the highest power in the first lens unit, and R2n is a radius of curvature of an image-side surface of the negative lens having the highest power in the first lens unit.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Figure 1:
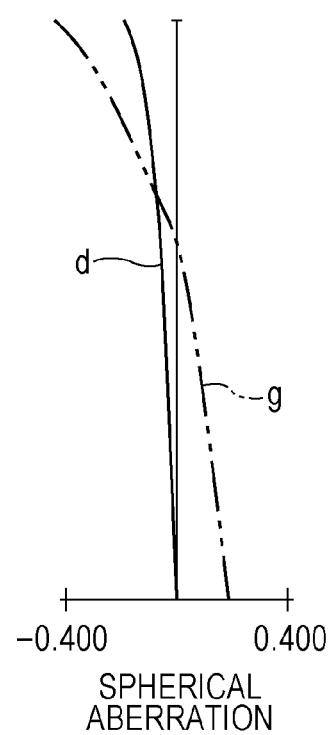
FIG. 1 illustrates chromatic spherical aberration.

FIG. 1 illustrates chromatic spherical aberration. FIGS. 2, 5, 8, and 11 respectively illustrate sectional views of a zoom lens according to a first, second, third, and fourth numerical examples of the present invention. FIGS. 3, 6, 9, and 12 respectively illustrate aberration charts of the zoom lenses according to the first, second, third, and fourth numerical examples at the wide angle end when focusing on an object at infinity. FIGS. 4, 7, 10, and 13 respectively illustrate aberration charts of the zoom lenses according to the first, second, third, and fourth numerical examples at the telephoto end when focusing on an object at infinity.

In the sectional views of FIGS. 2, 5, 8, and 11, "NL" indicates an optical element composed of an anomalous dispersion optical material (an anomalous dispersion optical element), "SP" indicates an aperture stop, "IP" indicates the image plane, and—where applicable—an asterisk indicates the position of an aspherical surface.

In the aberration charts of FIGS. 3, 6, 9, and 12, "d" and "g" respectively indicate the Fraunhofer d-line and g-line, "ΔM" and "ΔS" respectively indicate the meridional image plane and the sagittal image plane, and the transverse chromatic aberration is represented by the g-line.

The principle of chromatic aberration correction as addressed by the exemplary embodiments of the present invention will be now described. In general, telephoto zoom lenses have axial chromatic aberration and transverse chromatic aberration at the telephoto end. Such aberrations can be corrected by disposing an optical element that is composed of a material having a higher partial dispersion ratio than an ordinary lens material and that has a positive power at a position in front of the aperture stop and at which the axial ray height and the paraxial chief ray height are large. When primary achromatization is performed by using an ordinary lens material, the secondary spectrum increases because a high-dispersion lens material having a high partial dispersion ratio is used for a negative lens. According to the various exemplary embodiments of the present invention, the power and the anomalous partial dispersion of a positive lens are set in an appropriate range, and thereby primary and secondary achromatizations are both performed. That is, the parameter expressed by conditional expression (1) described below is set in an appropriate range suitable to best address axial and transverse chromatic aberration.

If, on the basis of the aforementioned idea, an optical element having a positive power and composed of an anomalous dispersion optical material is used in a first lens unit, for which the axial ray height and the paraxial chief ray height are large, in order to effectively correct axial chromatic aberration and transverse chromatic aberration, chromatic spherical aberration occurs. With the present invention, a negative lens in the first lens unit has a meniscus shape whose convex surface faces the object side, and the difference between the radius of curvatures of the object-side surface and the image-side surface of the negative lens is small. As a result, chromatic spherical aberration for the g line, which occurs on the undercorrected side, is intentionally corrected toward the overcorrected side.

If the aforementioned idea is used to effectively correct chromatic aberration, the radius of curvature of a positive lens decreases and the field curvature from a middle range to the telephoto end increases, which is undesirable. According to embodiments of the present invention, however, the ratio of the Abbe number of a positive lens and the Abbe number of a negative lens in the first lens unit is set in an appropriate range. Thus, the radius of curvature of the positive lens is maintained to be large, and thereby the field curvature in all zoom ranges is prevented from increasing.

The aforementioned idea is realized by satisfying conditional expressions (1) to (3).

According to each of the first to fourth embodiments discussed below, a zoom lens includes, from an object side to an image side thereof, a first lens unit having a positive refractive power, a second lens unit having a negative refractive power, and a subsequent lens unit. The first lens unit includes an optical element composed of an anomalous dispersion optical material, a positive lens, and a negative lens. The following conditional expressions are satisfied:

$$100 < \frac{vdp * fp}{\Delta\theta_{g,Fp} * \sqrt{fw \times ft}} < 1200 \quad (1)$$

$$-10.0 < (R2n + R1n)/(R2n - R1n) < -3.3 \quad (2)$$

$$2.8 < vdp1/vdn < 6.0. \quad (3)$$

Conditional expression (1) defines the range of chromatic-aberration-correction power of an anomalous dispersion optical material that is appropriate for removing the secondary spectrum of axial chromatic aberration and transverse chromatic aberration. Herein, the chromatic-aberration-correction power of an anomalous dispersion optical material appropriate for removing the secondary spectrum of axial and transverse chromatic aberration may be referred to as "secondary achromatization". If the upper limit of conditional expression (1) is not satisfied, secondary achromatization is insufficient; and thus it is difficult to sufficiently correct axial chromatic aberration and transverse chromatic aberration. If, however, the lower limit of conditional expression (1) is not satisfied, secondary achromatization is excessive, which is undesirable.

Conditional expression (2) defines the shape of a negative lens in the first lens unit that is appropriate for correcting chromatic spherical aberration. Specifically, conditional expression (2) defines the shape of the negative lens by establishing a range of values for (a) the radius of curvature of the object-side surface R1n and (b) the radius of curvature of the image-side surface R2n of the negative lens having a highest power in the first lens unit. By using an optical component composed of an anomalous dispersion optical material having high secondary achromatization power in the first lens unit, secondary achromatization power is increased, and therefore axial chromatic aberration and transverse chromatic aberration can be corrected. On the other hand, chromatic spherical aberration occurs because the axial ray height is large. Here, the term "chromatic spherical aberration" refers to the difference between spherical aberrations for different wavelengths. As illustrated in FIG. 1, with conventional optical systems, when axial chromatic aberration and transverse chromatic aberration are effectively corrected, spherical aberration for a short wavelength (in particular, g line) becomes undercorrected, and therefore the optical performance tends to degrade. By limiting the shape of the negative lens to an appropriate range of curved surfaces, the spherical aberration that occurs on the undercorrected side, which is caused by the optical element, is corrected toward the overcorrected side, and thereby the chromatic spherical aberration is corrected. If the upper limit of conditional expression (2) is not satisfied, spherical aberration caused by the negative lens is small and it becomes difficult to correct the chromatic spherical aberration, which is undesirable. If the lower limit of conditional expression (2) is not satisfied, spherical aberration caused by the negative lens is excessive, which is also undesirable. Therefore, conditional expression (2) defines the shape of the negative lens by establishing a range of values for the radius of curvature of the object-side surface R1n and the radius of curvature of the image-side surface R2n.

Conditional expression (3) defines a range of the ratio of the Abbe number of a negative lens in the first lens unit to the Abbe number of a positive lens having the highest power in the first lens unit. In order to correct chromatic aberration, the powers of an optical element and a positive lens in the first lens unit may be increased. However, if the shape of the positive lens is not in a certain range, it becomes difficult to maintain the image plane to be appropriately flat in all zoom ranges. If the upper limit of conditional expression (3) is not satisfied, the dispersion of the negative lens is too high, and therefore it becomes difficult to correct chromatic aberration, which is undesirable. If the lower limit of conditional expression (3) is not satisfied, the ratio of the Abbe numbers is low, and therefore it becomes difficult to correct the field curvature, which is undesirable.

Hereinafter, first to fourth exemplary embodiments will be described.

First Embodiment

Figure 2:
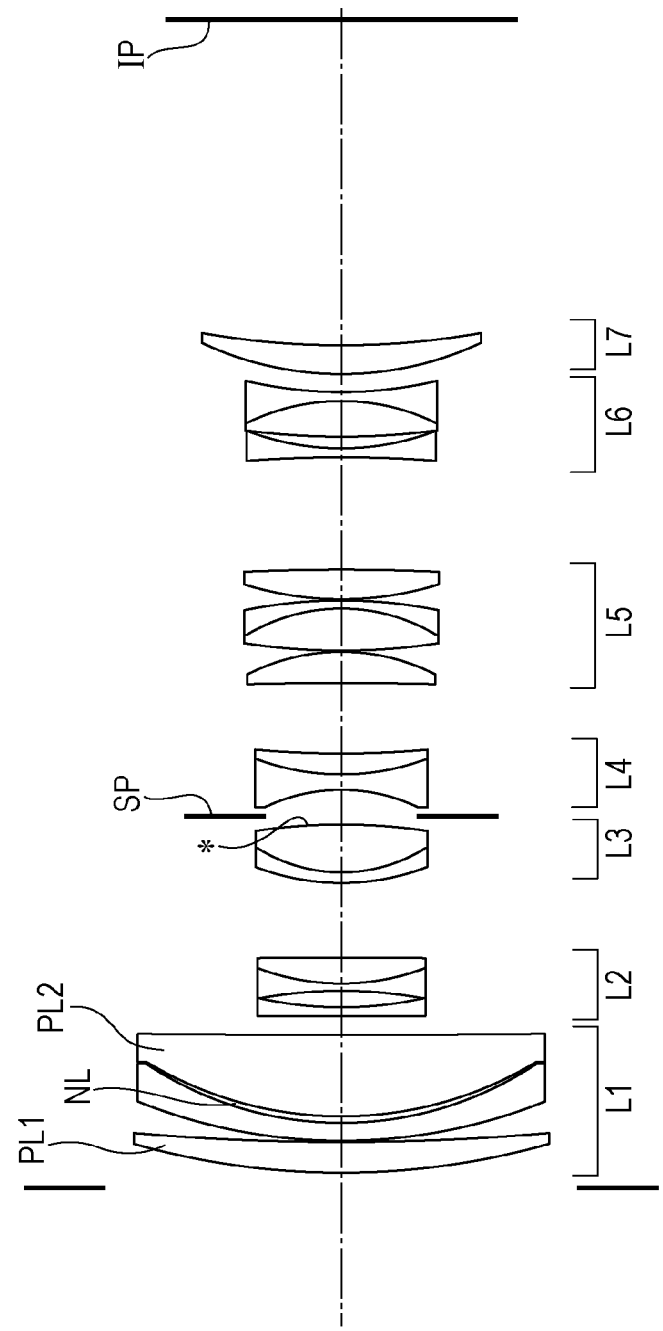
FIG. 2 is a sectional view of a lens according to a first numerical example of the present invention.
Figure 3:
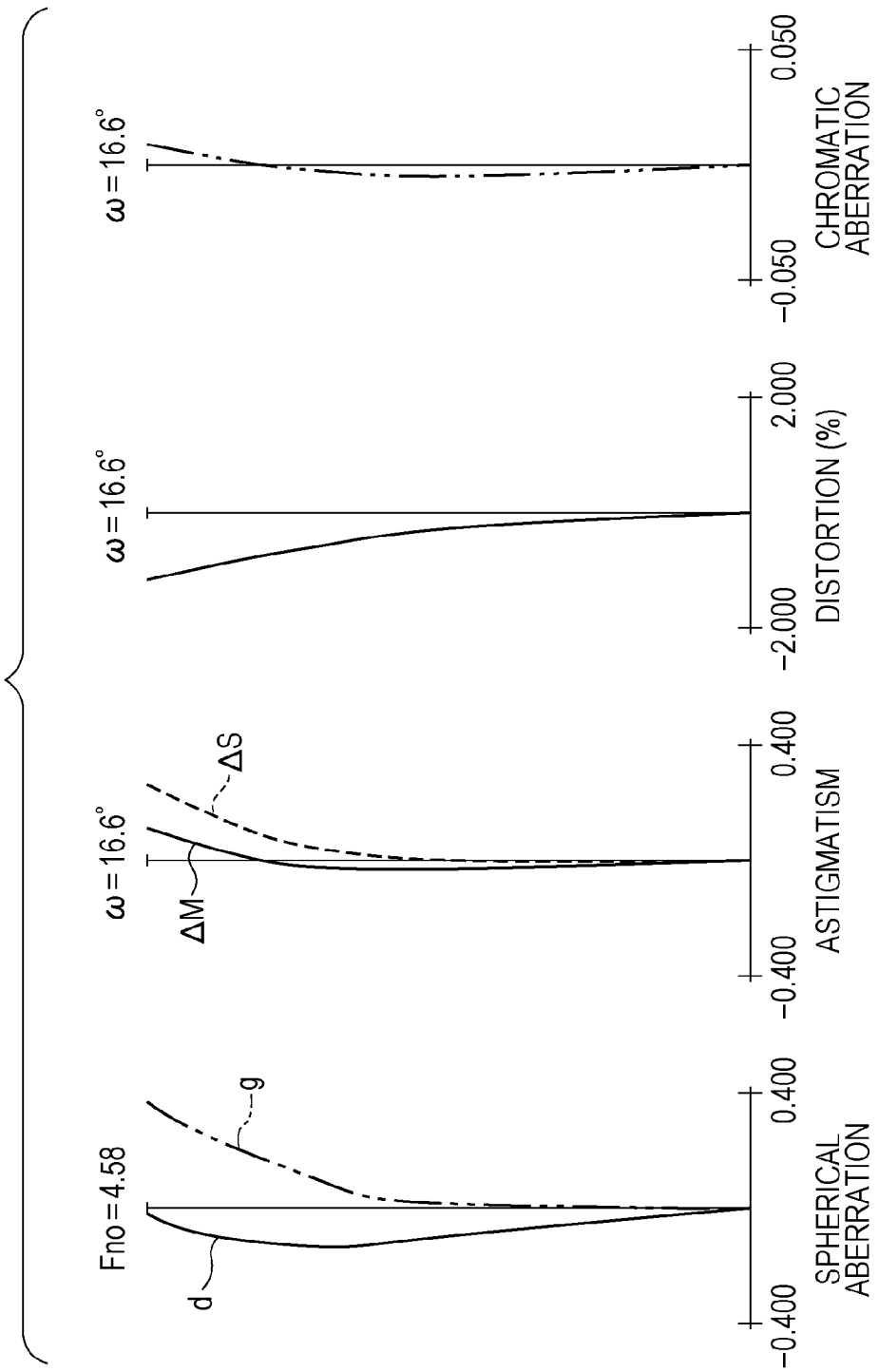
FIG. 3 illustrates aberration charts of the first numerical example of the present invention at the wide angle end.
Figure 4:
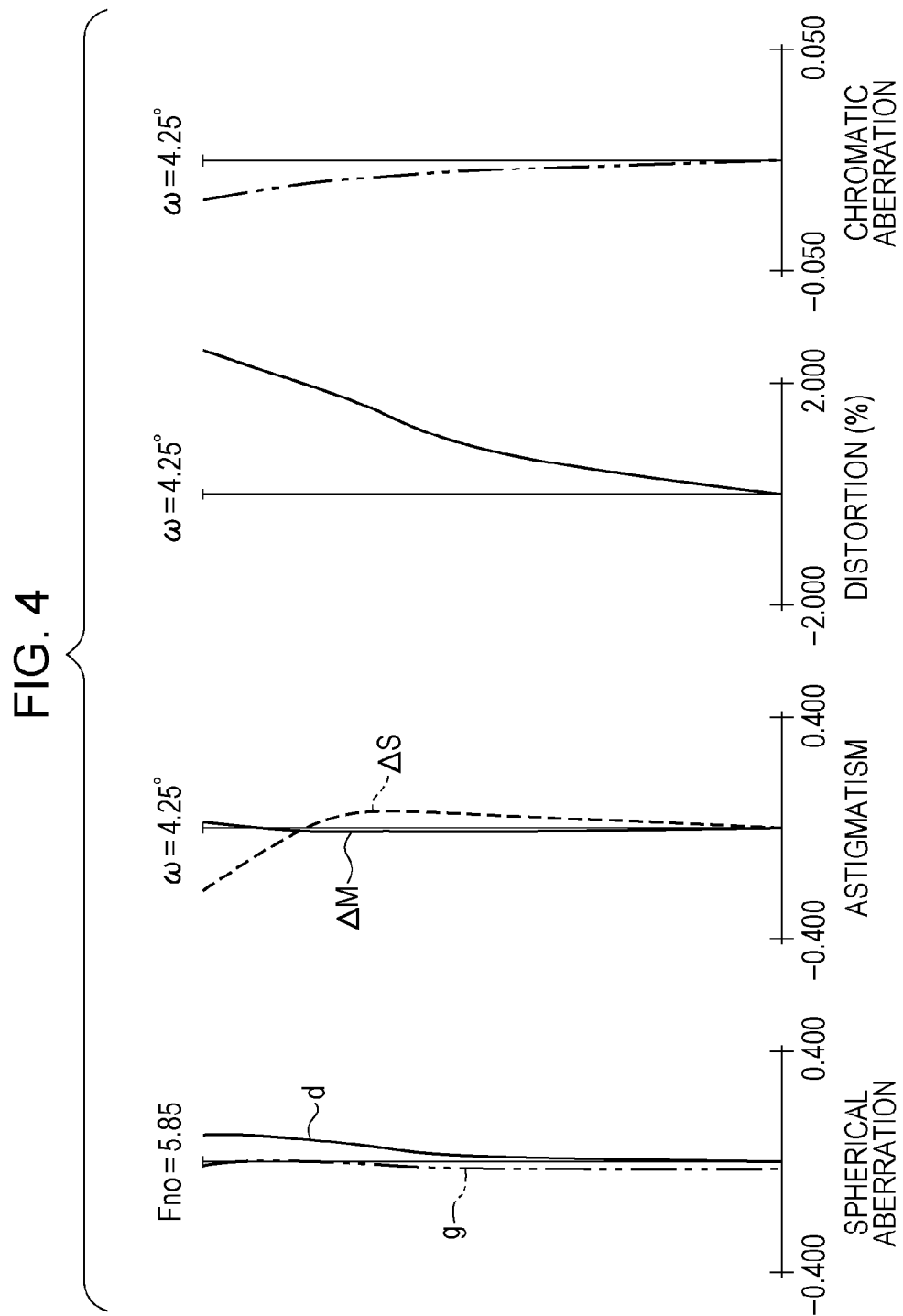
FIG. 4 illustrates aberration charts of the first numerical example of the present invention at the telephoto end.

Referring to FIG. 2, the structure of a zoom lens according to the first embodiment of the present invention will be described.

As illustrated in FIG. 2, a zoom lens according to the first embodiment includes, from the object side, a first lens unit L1 having a positive refractive power; a second lens unit L2 having a negative refractive power; and subsequent lens units L3, L4, L5, L6, and L7 respectively having positive, negative, positive, negative, and positive refractive powers. The first lens unit L1 includes a first positive lens PL1, a negative lens, an anomalous dispersion element NL, and a second positive lens PL2. The lens units L2 through L7 may include any number of positive or negative lenses, or combinations of positive and negative lenses, as long as the respective refractive powers are satisfied.

A more detailed description of the optical element composed of an anomalous dispersion optical material (anomalous dispersion optical element NL) having a high partial dispersion ratio used in the first lens unit L1 is now provided. The anomalous dispersion optical element NL has a positive power and is located at a predetermined position on the object side of the aperture stop at which the axial ray height and the paraxial chief ray height are large. Here, the optical element NL, which has characteristics different from those of an optical element made of a general lens material, may be made of a mixture of a synthetic resin and nanoparticles of one of the following inorganic oxides dispersed in the synthetic resin: $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), $BaTiO_3$ (Nd=2.4362, vd=11.3), and the like. In particular, the optical material shown in the present description can be obtained when nanoparticles of $TiO_2$ (Nd=2.304, vd=13.8, $\theta gF$=0.87), which is among these inorganic oxides, are dispersed in a synthetic resin with an appropriate volume ratio.

As described above, a material having high dispersion and a high partial dispersion ratio and a material having low dispersion are used for the positive lenses, and thereby primary and secondary achromatizations are both achieved. Moreover, spherical aberration for the g line, which occurs on the undercorrected side with this structure, is corrected toward the overcorrected side by setting the shape of the negative lens in the first lens unit L1 to be in an appropriate range.

Notably, with this structure, the radius of curvature of the positive lens is small and the field curvature from a middle range to the telephoto end is large. Such field curvature is corrected by setting the ratio of the Abbe number of the positive lens and the Abbe number of the negative lens in the first lens unit L1 to be in an appropriate range.

It is more preferable that the following conditional expression (1a) be satisfied, because in this case, axial chromatic aberration and transverse chromatic aberration can be effectively corrected.

$$400 < \frac{vdp * fp}{\Delta\theta_{g,Fp} * \sqrt{fw \times ft}} < 1200 \quad (1a)$$

It is more preferable that the following conditional expression (2a) be satisfied, because in this case, chromatic spherical aberration can be effectively corrected.

$$-8.0 < (R2n+R1n)/(R2n-R1n) < -3.3 \quad (2a)$$

It is more preferable that the following conditional expression (3a) be satisfied, because in this case, field curvature can be effectively corrected.

$$3.0 < vdp1/vdn < 6.0 \quad (3a)$$

It is preferable that the positive lens in the first lens unit L1 satisfy the following conditional expression (4).

$$0.81 < (R2p+R1p)/(R2p-R1p) < 1.20 \quad (4)$$

Conditional expression (4) defines an appropriate shape of a positive lens having the highest power in the first lens unit L1. If the shape of the positive lens is not in a certain range, it becomes difficult to maintain the image plane to be appropriately flat in all zoom ranges. If the upper limit of conditional expression (4) is not satisfied, the radius of curvature on the image plane side is small relative to the radius of curvature on the object side, and therefore it becomes difficult to correct the image plane, which is undesirable. Likewise, if the lower limit of conditional expression (4) is not satisfied, the radius of curvature on the image plane side is small relative to the radius of curvature on the object side, and therefore it becomes difficult to correct the image plane, which is undesirable.

It is more preferable that the following conditional expression (4a) be satisfied, because in this case, the image plane can be maintained to be appropriately flat.

$$0.84 < (R2p+R1p)/(R2p-R1p) < 1.16 \quad (4a)$$

It is preferable that the first lens unit L1 satisfy the following conditional expression (5).

$$1.00 < \sqrt{(fw \cdot ft)}/f1 < 1.50 \quad (5)$$

Conditional expression (5) defines the relationship among the focal length f1 of the first lens unit L1, the focal length fw of the entire system at the wide angle end, and the focal length ft of the entire system at the telephoto end. Conditional expression (5) represents that the ratio of the power of the entire system to the power of the first lens unit L1 is in a certain range. If the ratio is in this range, the size of the zoom lens can be reduced. If the upper limit of conditional expression (5) is not satisfied, the power of the first lens unit L1 is excessively high relative to the power of the entire system and therefore it becomes difficult to correct spherical aberration, which is undesirable. If the lower limit of conditional expression (5) is not satisfied, the power of the first lens unit L1 is excessively low relative to the power of the entire system and therefore it becomes difficult to reduce the size of the zoom lens, which is undesirable.

It is more preferable that the following conditional expression (5a) be satisfied, because in this case, the size of the zoom lens can be reduced.

$$1.10 < \sqrt{(fw \cdot ft)}/f1 < 1.50 \quad (5a)$$

It is preferable that the first lens unit L1 and the second lens unit L2 satisfy the following conditional expression (6).

$$-4.0 < f1/f2 < -2.0 \quad (6)$$

Here, f2 is the focal length of the second lens unit L2.

Conditional expression (6) defines the relationship between the focal length of the first lens unit L1 and the focal length of the second lens unit L2. Conditional expression (6) represents that the ratio of the power of the first lens unit L1 and the power of to the second lens unit L2 is in a certain range. In the ratio is in this range, the size of the zoom lens can be reduced. If the upper limit of conditional expression (6) is not satisfied, the power of the second lens unit L2 is excessively high relative to the power of the first lens unit L1, and therefore it becomes difficult to correct spherical aberration, which is undesirable. If the lower limit of conditional expression (6) is not satisfied, the power of the second lens unit L2 is excessively low relative to the power of the first lens unit L1, and therefore it becomes difficult to reduce the size of the zoom lens, which is undesirable.

It is more preferable that the following conditional expression (6a) be satisfied, because in this case, the image plane can be maintained to be appropriately flat.

$$-2.5 < f1/f2 < -4.0 \quad (6a)$$

Second Embodiment

Figure 5:
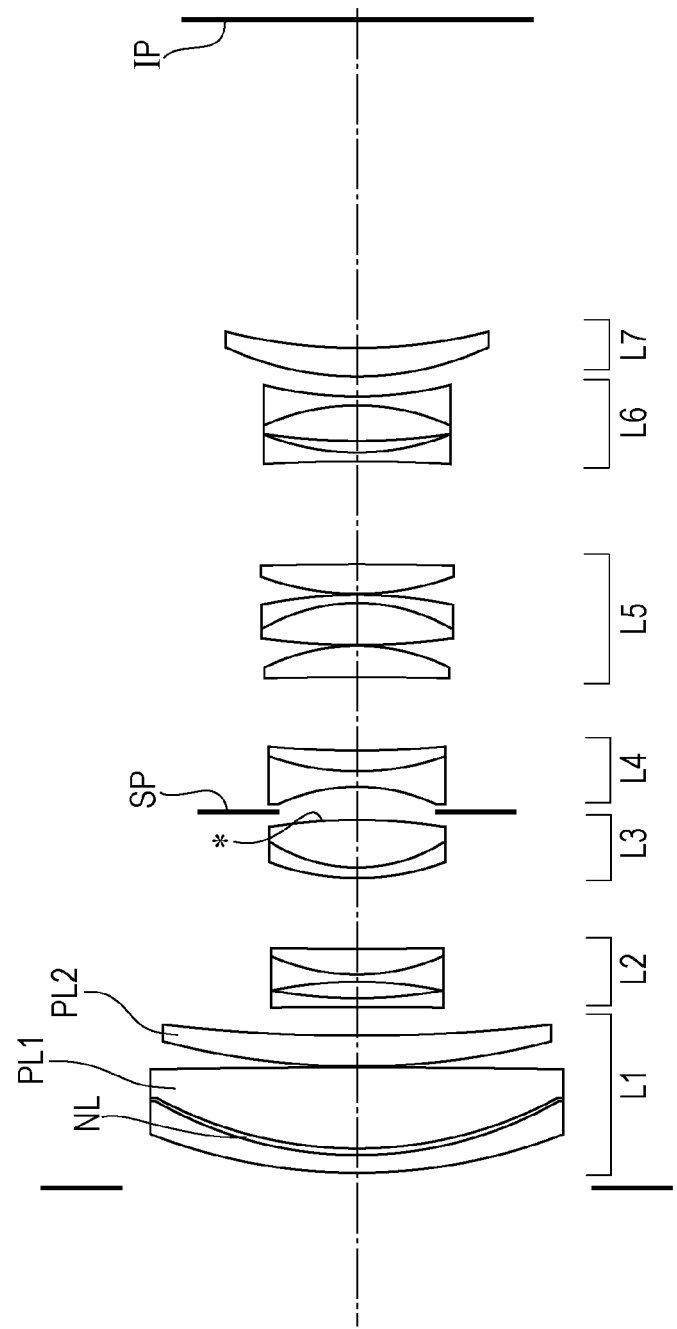
FIG. 5 is a sectional view of a lens according to a second numerical example of the present invention.
Figure 6:
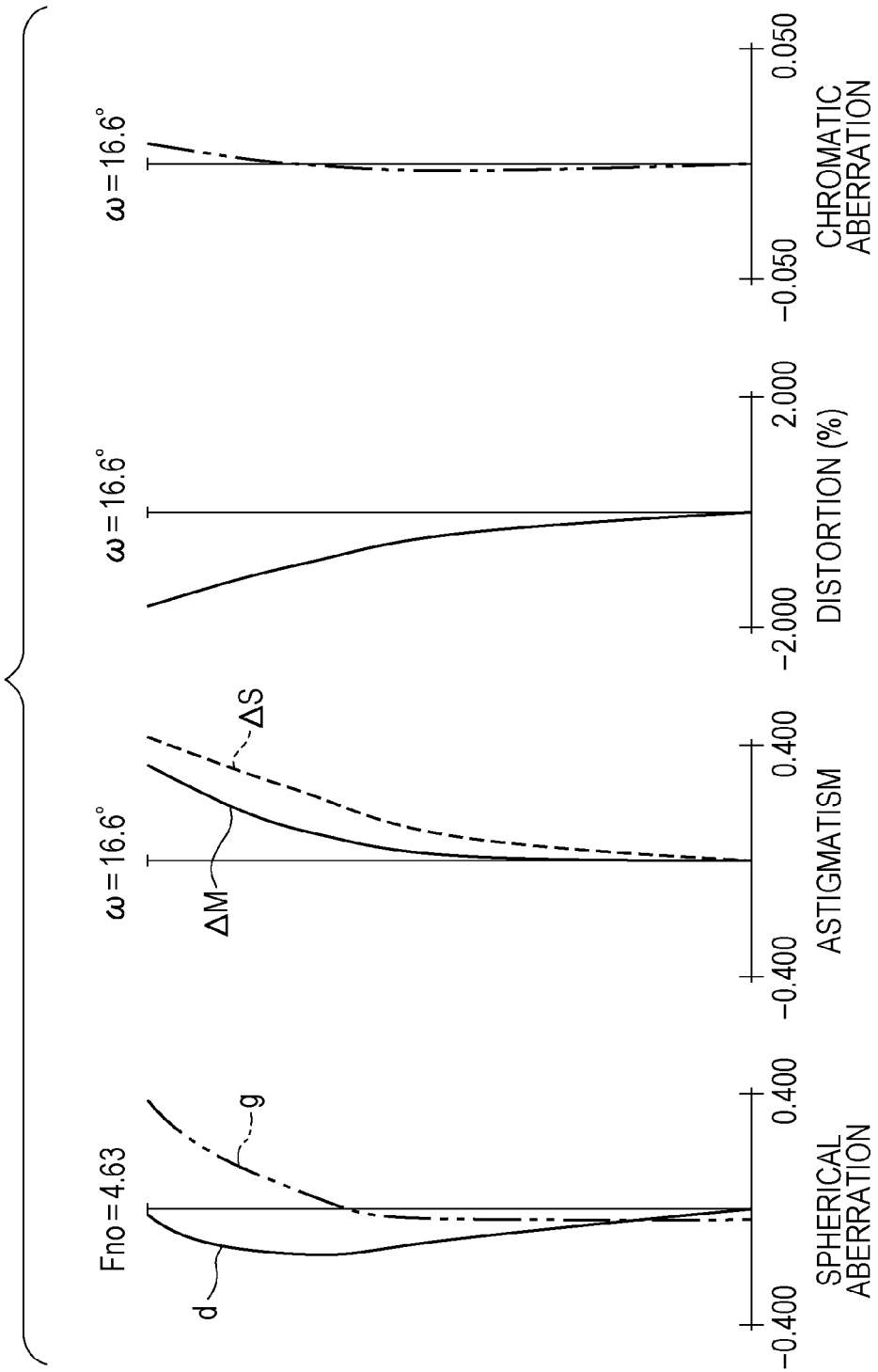
FIG. 6 illustrates aberration charts of the second numerical example of the present invention at the wide angle end.
Figure 7:
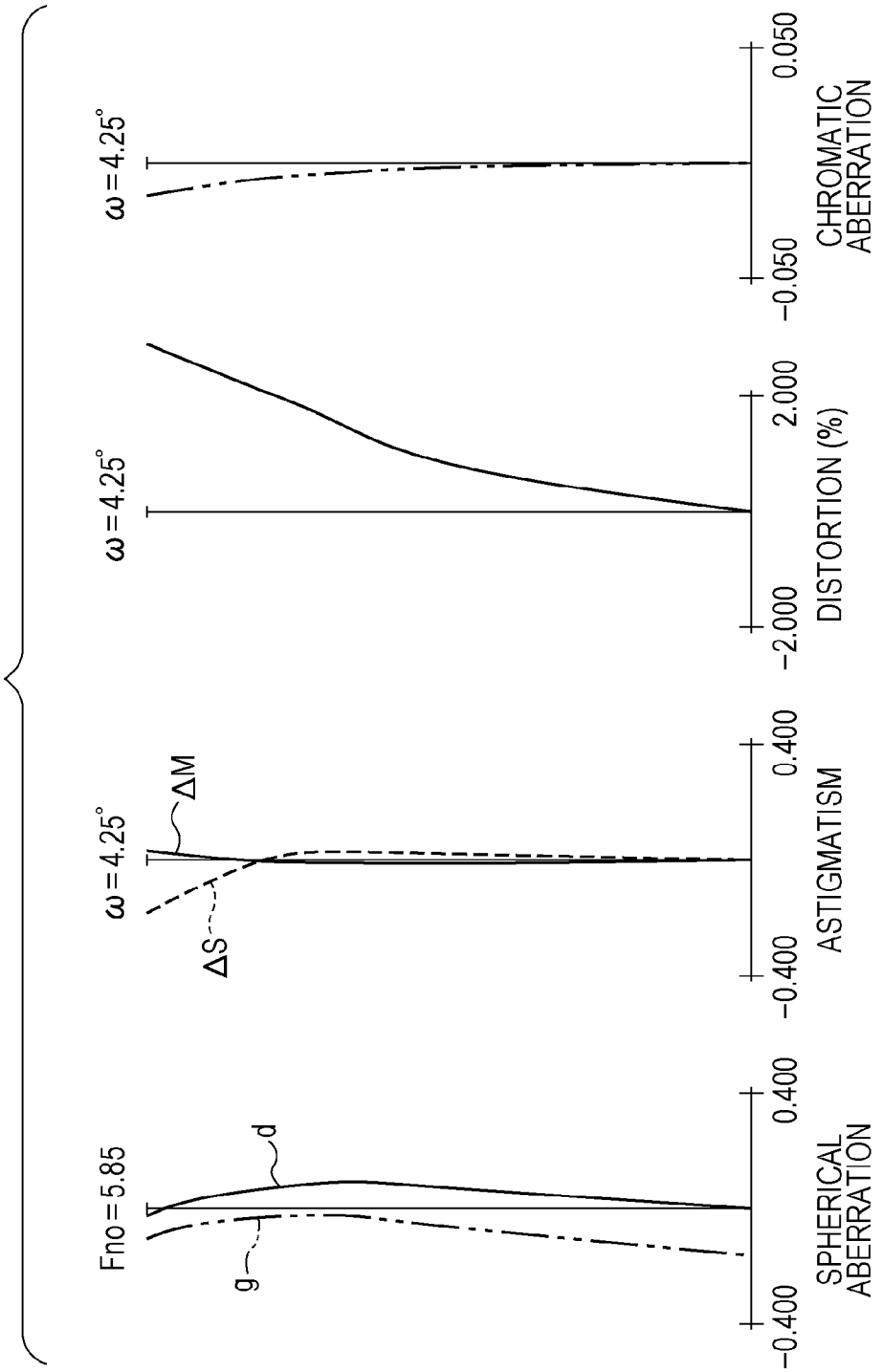
FIG. 7 illustrates aberration charts of the second numerical example of the present invention at the telephoto end.

Referring to FIG. 5, the structure of a zoom lens according to the second embodiment of the present invention will be described.

As illustrated in FIG. 5, a zoom lens according to the second embodiment includes, from the object side, a first lens unit L1 having a positive refractive power; a second lens unit L2 having a negative refractive power; and subsequent lens units L3, L4, L5, L6, and L7 respectively having positive, negative, positive, negative, and positive refractive powers. The second embodiment differs from the first embodiment in that the first lens unit L1 of the second embodiment includes a negative lens, a first positive lens, and a second positive lens from the object side, while the first lens unit L1 of the first embodiment includes a positive lens, a negative lens, and a positive lens from the object side. The power of an optical element composed of an anomalous dispersion optical material used in the second embodiment is lower than that of the first embodiment. This is because, the axial ray height and the oblique ray height are both increased by disposing the optical element composed of an anomalous dispersion optical material closer to the object plane (furthest on the object side) in the first lens unit L1. Therefore, the influence of the optical element on correcting aberrations is increased.

Third Embodiment

Figure 8:
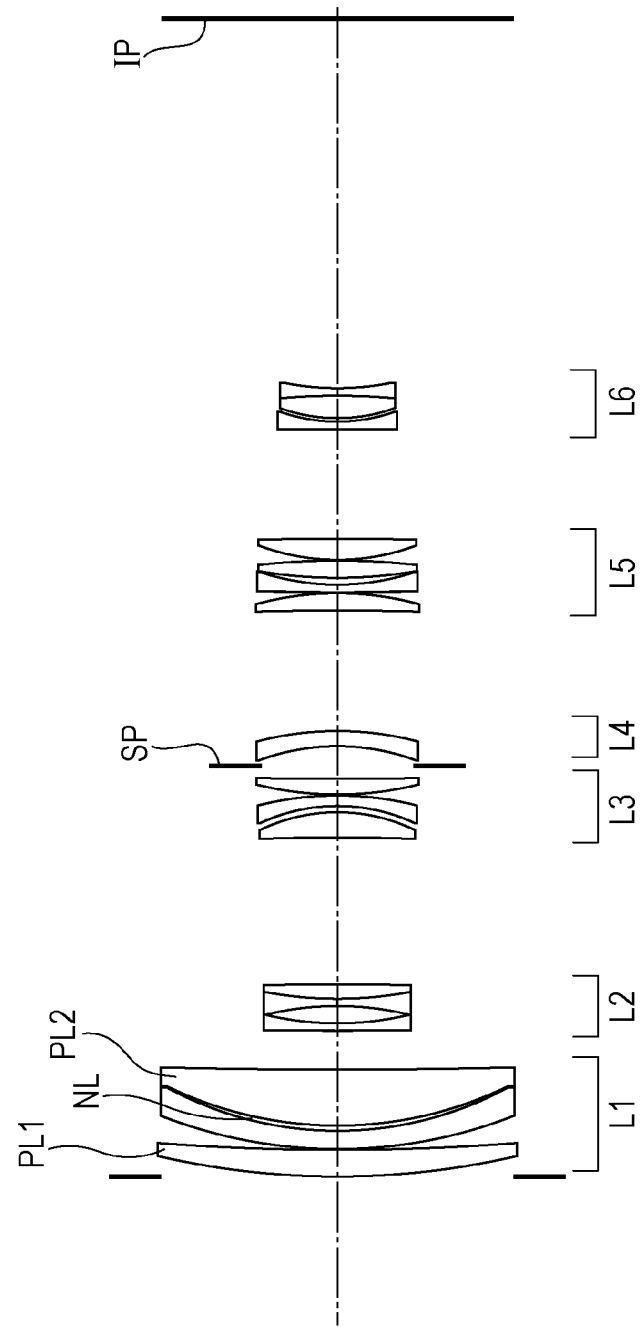
FIG. 8 is a sectional view of a lens according to a third numerical example of the present invention.
Figure 9:
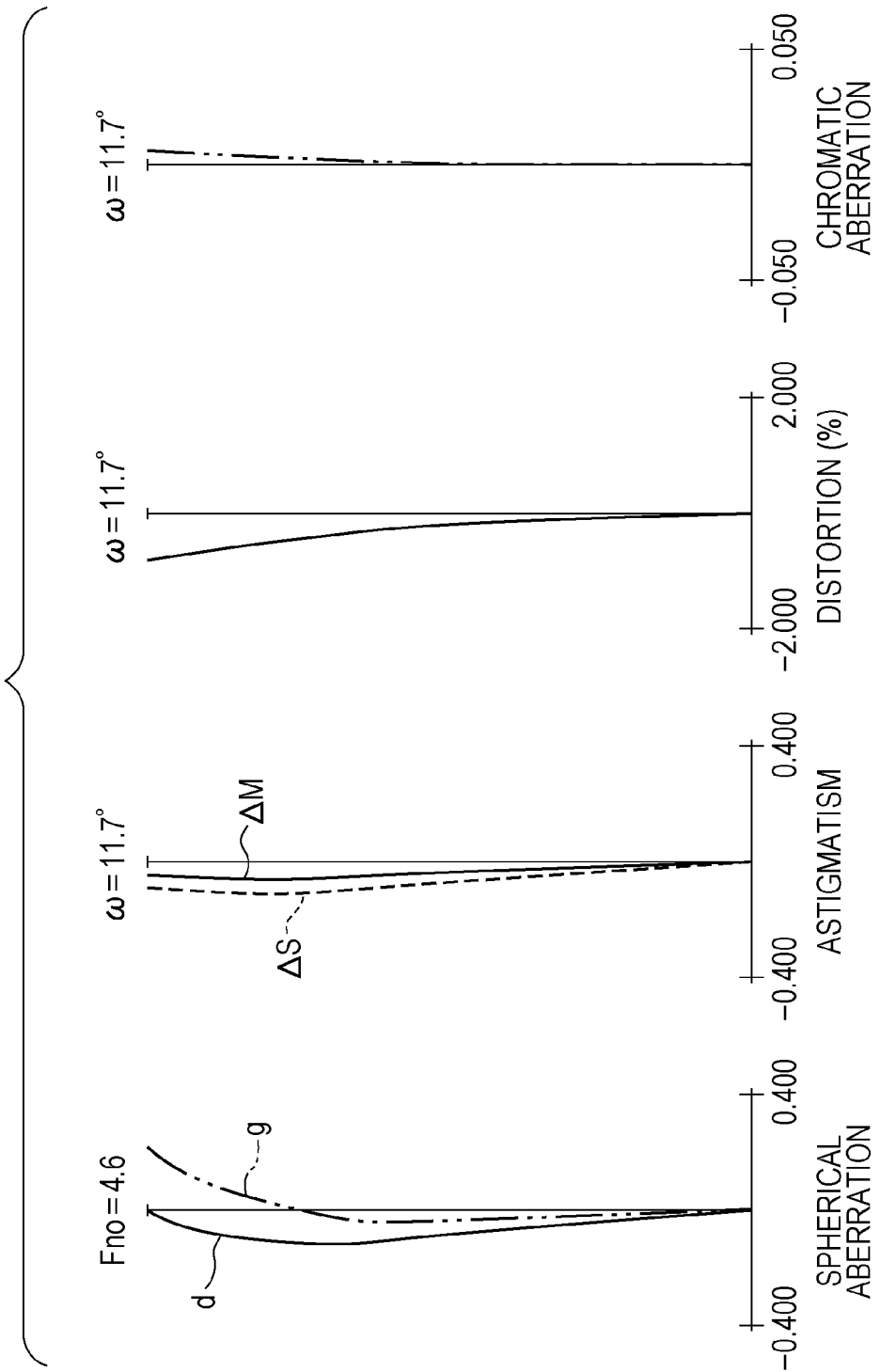
FIG. 9 illustrates aberration charts of the third numerical example of the present invention at the wide angle end.

Referring to FIG. 8, the structure of a zoom lens according to the third embodiment of the present invention will be described.

As illustrated in FIG. 8, a zoom lens according to the third embodiment includes, from the object side, a first lens unit L1 having a positive refractive power; a second lens unit L2 having a negative refractive power; and subsequent lens units L3, L4, L5, and L6 respectively having positive, negative, positive, and negative refractive powers. Similar to the first embodiment, the present embodiment includes an anomalous dispersion optical element NL in the first lens unit L1. However, contrary to the first embodiment, the present embodiment omits the use of the lens unit L7, which allows for a reduction in the entire length (size) of the zoom lens.

Fourth Embodiment

Figure 10:
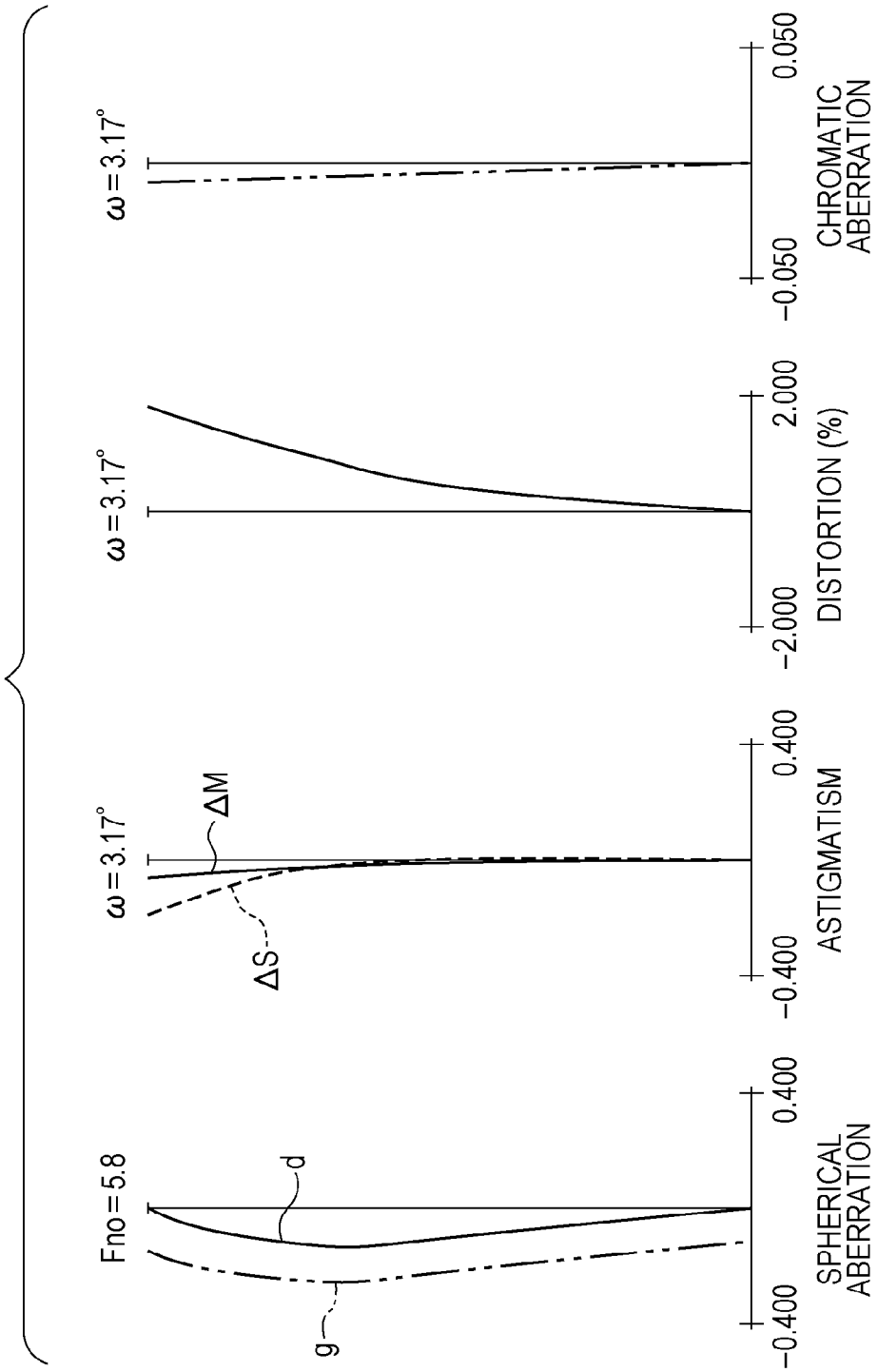
FIG. 10 illustrates aberration charts of the third numerical example of the present invention at the telephoto end.
Figure 11:
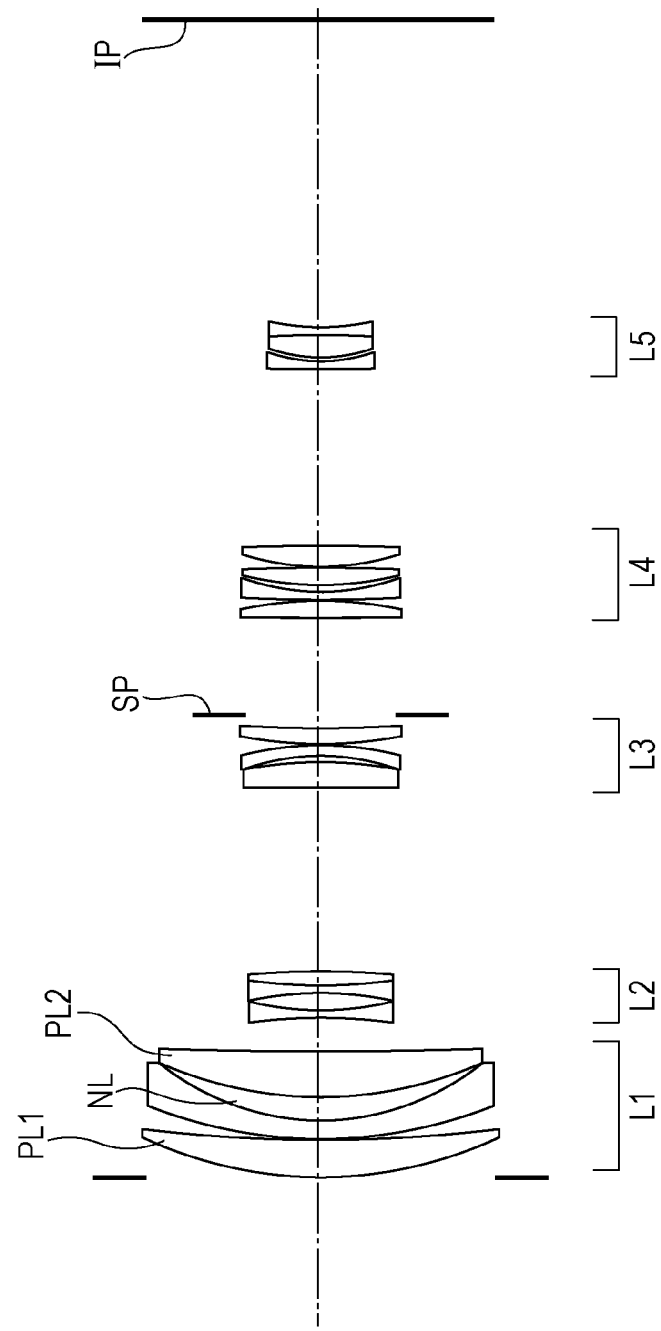
FIG. 11 is a sectional view of a lens according to a fourth numerical example of the present invention.
Figure 12:
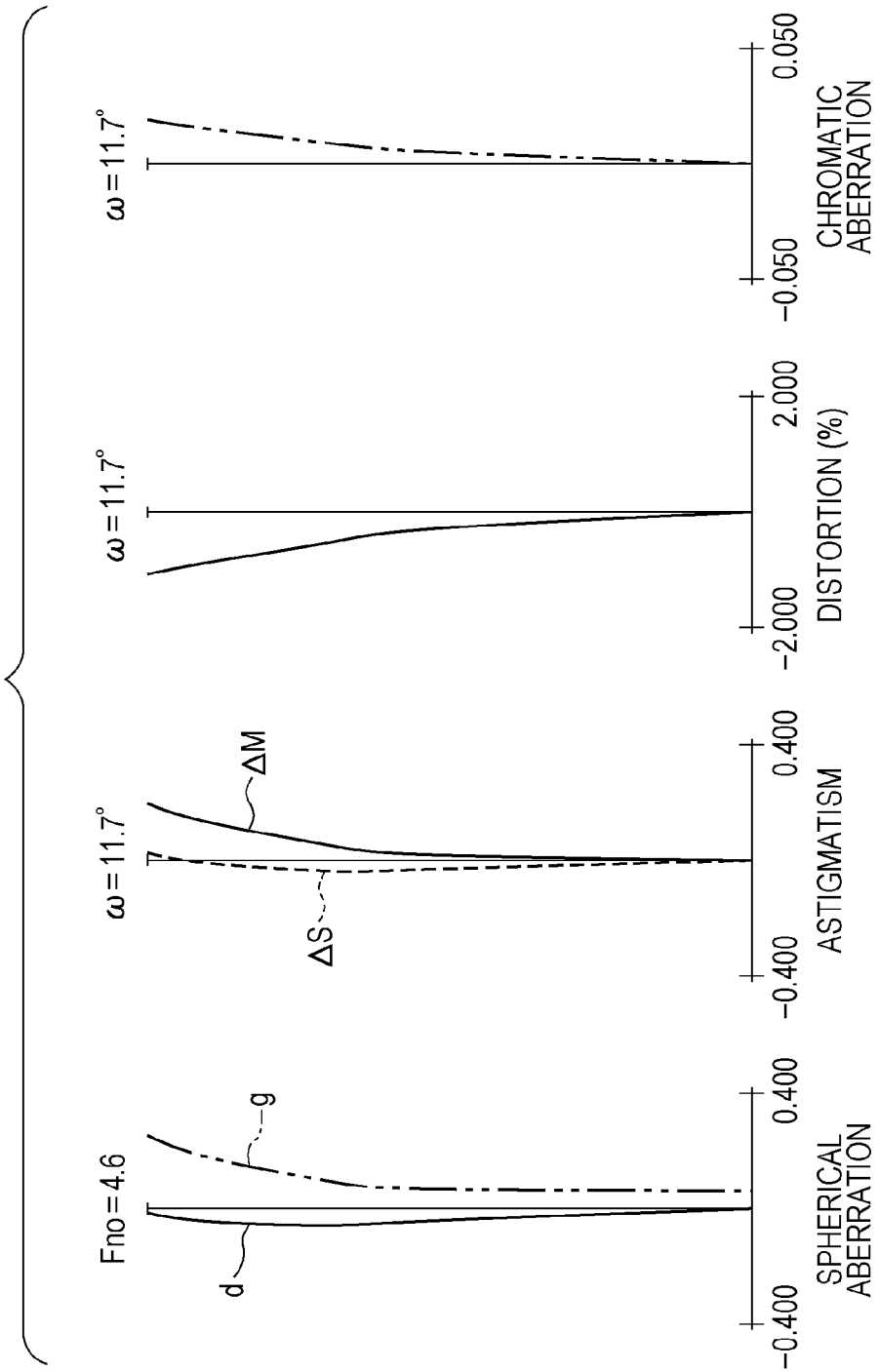
FIG. 12 illustrates aberration charts of the fourth numerical example of the present invention at the wide angle end.
Figure 13:
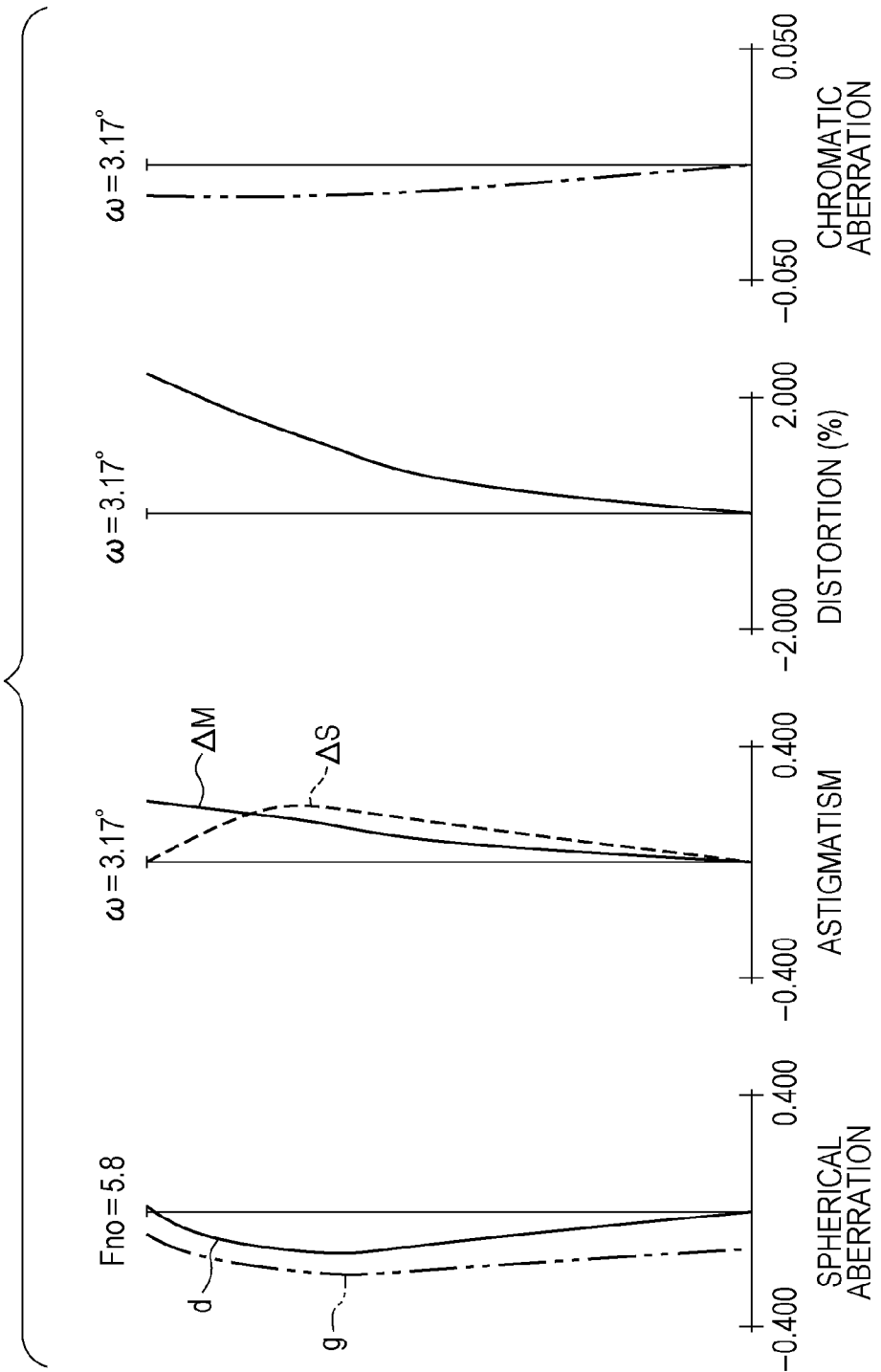
FIG. 13 illustrates aberration charts of the fourth numerical example of the present invention at the telephoto end.

Referring to FIG. 10, the structure of a zoom lens according to the fourth embodiment of the present invention will be described.

As illustrated in FIG. 10, a zoom lens according to the fourth embodiment includes, from the object side, a first lens unit L1 having a positive refractive power; a second lens unit L2 having a negative refractive power; and subsequent lens units L3, L4, and L5 respectively having positive, positive, and negative refractive powers. Similar to the first embodiment and third embodiment, the present embodiment includes an anomalous dispersion optical element NL at a location before the aperture stop, in the first lens unit L1. In the fourth embodiment, however, the negative lens unit L4 of the third embodiment is omitted and there are only five lens units, so that the size of the zoom lens is further reduced. As compared with the third embodiment, the power of the first lens unit is increased, and thereby the size of the zoom lens is further reduced. Axial chromatic aberration and transverse chromatic aberration that occur due to reduction in the size of the zoom lens is corrected by increasing the achromatization power of the optical element NL.

The present invention is not limited to the embodiments described above and the embodiments can be modified in various ways within the spirit and scope of the present invention.

Numerical examples according to each of first to fourth exemplary embodiments of the present invention are listed below.

In the numerical examples, "ri" denotes the radius of curvature of the i-th lens surface from the object side, "di" denotes the thickness of the i-th lens or an air space between lenses, and "ndi" and "vdi" respectively denote the refractive index and the Abbe number of the material of the i-th lens. An aspherical shape is represented by the following equation $$X = \frac{\frac{Y^2}{R}}{1 + \sqrt{1 - (1+k)\left(\frac{Y}{R}\right)^2}} + A_4 Y^4 + A_6 Y^6 + A_8 Y^8 + A_{10} Y^{10} + \ldots ,$$

where R is the radius of curvature of a central part of a lens surface, the X axis extends in the optical axis direction, the Y axis extends in a direction perpendicular to the optical axis, and $A_i$ (i=1, 2, 3, ...) are aspherical coefficients.

First Numerical Example

| Unit mm | | | | | | |
|---|---|---|---|---|---|---|
| Surface data | | | | | | |
| No. | r | d | nd | vd | Effective diameter | $\theta_{gF}$ |
| 1 | ∞ | 1.85 | | | 58.00 | |
| 2 | 93.685 | 3.77 | 1.51823 | 59.0 | 49.72 | |
| 3 | 296.982 | 0.15 | | | 49.45 | |
| 4 | 67.271 | 2.20 | 1.84666 | 23.8 | 48.73 | |
| 5 | 43.225 | 0.80 | 1.76498 | 15.0 | 46.69 | |
| 6 | 46.301 | 10.00 | 1.48749 | 70.2 | 46.58 | 0.748 |
| 7 | 2399.304 | (variable) | | | 45.47 | |
| 8 | 1715.304 | 1.10 | 1.85026 | 32.3 | 19.38 | |
| 9 | 46.248 | 2.02 | | | 18.90 | |
| 10 | −51.935 | 0.90 | 1.80400 | 46.6 | 18.89 | |
| 11 | 28.909 | 3.19 | 1.84666 | 23.9 | 19.30 | |
| 12 | −758.867 | (variable) | | | 19.44 | |

-continued

Unit mm

| | | | | | |
|---|---|---|---|---|---|
| 13 | 29.395 | 1.30 | 1.80518 | 25.4 | 19.90 |
| 14 | 19.377 | 5.87 | 1.58313 | 59.4 | 19.41 |
| 15* | −69.703 | 1.00 | | | 19.13 |
| 16 (aperture stop) | ∞ | (variable) | | | 18.59 |
| 17 | −21.862 | 1.90 | 1.58913 | 61.1 | 17.56 |
| 18 | 29.917 | 2.56 | 1.80518 | 25.4 | 19.66 |
| 19 | 118.022 | (variable) | | | 19.99 |
| 20 | −463.650 | 3.83 | 1.58313 | 59.4 | 21.34 |
| 21 | −25.424 | 0.15 | | | 21.92 |
| 22 | 79.108 | 5.16 | 1.48749 | 70.2 | 22.21 |
| 23 | −22.615 | 1.00 | 1.84666 | 23.9 | 22.16 |
| 24 | −59.639 | 0.15 | | | 22.69 |
| 25 | 40.122 | 3.64 | 1.56384 | 60.7 | 22.74 |
| 26 | −260.994 | (variable) | | | 22.39 |
| 27 | −152.152 | 1.10 | 1.83481 | 42.7 | 22.08 |
| 28 | 32.430 | 1.43 | | | 21.65 |
| 29 | 89.790 | 4.38 | 1.80518 | 25.4 | 21.73 |
| 30 | −26.311 | 1.10 | 1.83481 | 42.7 | 21.85 |
| 31 | 50.788 | (variable) | | | 22.34 |
| 32 | 40.319 | 3.53 | 1.51742 | 52.4 | 32.92 |
| 33 | 98.386 | (variable) | | | 33.00 |
| Image plane | ∞ | | | | |

Aspherical data
15th surface

K = 0.00000e+000 A4 = 1.93579e−006 A6 = −4.61734e−009 A8 = −6.71788e−012

Miscellaneous data
Zoom ratio 4.01

| | | | | | |
|---|---|---|---|---|---|
| Focal Length | 72.48 | 135.49 | 290.86 | 100.37 | 200.68 |
| F number | 4.58 | 4.94 | 5.85 | 4.63 | 5.39 |
| Angle of view | 16.62 | 9.07 | 4.25 | 12.16 | 6.15 |
| Image height | 21.64 | 21.64 | 21.64 | 21.64 | 21.64 |
| Lens length | 143.42 | 175.48 | 201.87 | 161.71 | 190.75 |
| BF | 39.98 | 39.98 | 39.98 | 39.98 | 39.98 |
| d7 | 2.29 | 34.35 | 60.74 | 20.58 | 49.62 |
| d12 | 9.16 | 4.96 | 0.99 | 6.83 | 3.30 |
| d16 | 3.26 | 10.76 | 17.35 | 7.28 | 14.26 |
| d19 | 8.66 | 5.35 | 2.73 | 6.96 | 3.52 |
| d26 | 13.79 | 11.84 | 0.99 | 13.25 | 7.64 |
| d31 | 2.21 | 4.16 | 15.01 | 2.75 | 8.36 |
| d33 | 39.98 | 39.98 | 39.98 | 39.98 | 39.98 |
| Entrance pupil position | 36.23 | 112.27 | 264.50 | 72.18 | 183.48 |
| Exit pupil position | −31.36 | −36.35 | −56.28 | −33.52 | −43.20 |
| Front principal point position | 35.07 | 7.26 | −323.55 | 35.50 | −99.99 |
| Rear principal point position | −32.50 | −95.51 | −250.88 | −60.39 | −160.70 |

Zoom lens unit data

| Unit | Initial surface | Focal length | Lens unit length | Front pricipal point position | Rear principal point position |
|---|---|---|---|---|---|
| 1 | 1 | 118.28 | 18.77 | 1.15 | −11.62 |
| 2 | 8 | −32.12 | 7.21 | 1.33 | −3.49 |
| 3 | 13 | 41.92 | 8.17 | 1.22 | −4.34 |
| 4 | 17 | −37.42 | 4.46 | 0.34 | −2.24 |
| 5 | 20 | 24.66 | 13.93 | 4.40 | −4.90 |
| 6 | 27 | −24.11 | 8.01 | 2.06 | −2.77 |
| 7 | 32 | 129.35 | 3.53 | −1.58 | −3.86 |

Single lens data

| Lens | Initial surface | Focal length |
|---|---|---|
| 1 | 1 | 262.42 |
| 2 | 4 | −149.08 |
| 3 | 5 | 764.27 |
| 4 | 6 | 96.71 |
| 5 | 8 | −55.92 |
| 6 | 10 | −22.98 |
| 7 | 11 | 32.95 |
| 8 | 13 | −74.95 |
| 9 | 14 | 26.65 |

-continued

| Unit mm | | |
|---|---|---|
| 10 | 17 | −21.15 |
| 11 | 18 | 49.14 |
| 12 | 20 | 45.98 |
| 13 | 22 | 36.69 |
| 14 | 23 | −43.57 |
| 15 | 25 | 61.95 |
| 16 | 27 | −31.94 |
| 17 | 29 | 25.70 |
| 18 | 30 | −20.63 |
| 19 | 32 | 129.35 |

Second Numerical Example

Unit mm

Surface data

| No. | r | d | nd | vd | Effective diameter | $\theta_{gF}$ |
|---|---|---|---|---|---|---|
| 1 | ∞ | 1.85 | | | 58.00 | |
| 2 | 70.515 | 2.20 | 1.84666 | 23.8 | 49.72 | |
| 3 | 49.931 | 0.80 | 1.76498 | 15.0 | 48.39 | 0.748 |
| 4 | 52.204 | 10.00 | 1.49700 | 81.6 | 48.25 | |
| 5 | −1398.871 | 0.15 | | | 47.54 | |
| 6 | 94.712 | 3.77 | 1.51823 | 59.0 | 46.60 | |
| 7 | 207.983 | (variable) | | | 45.83 | |
| 8 | −808.040 | 1.10 | 1.85026 | 32.3 | 20.10 | |
| 9 | 59.335 | 2.02 | | | 19.67 | |
| 10 | −51.523 | 0.90 | 1.80400 | 46.6 | 19.63 | |
| 11 | 25.952 | 3.19 | 1.84666 | 23.9 | 20.04 | |
| 12 | 916.257 | (variable) | | | 20.14 | |
| 13 | 31.224 | 1.30 | 1.80518 | 25.4 | 20.55 | |
| 14 | 19.887 | 5.87 | 1.58313 | 59.4 | 20.06 | |
| 15* | −66.502 | 1.00 | | | 19.85 | |
| 16 (aperture stop) | ∞ | (variable) | | | 19.30 | |
| 17 | −23.065 | 1.90 | 1.58913 | 61.1 | 18.22 | |
| 18 | 32.834 | 2.56 | 1.80518 | 25.4 | 20.26 | |
| 19 | 120.624 | (variable) | | | 20.61 | |
| 20 | −396.032 | 3.83 | 1.58313 | 59.4 | 21.00 | |
| 21 | −25.980 | 0.15 | | | 21.64 | |
| 22 | 86.853 | 5.16 | 1.48749 | 70.2 | 22.00 | |
| 23 | −23.136 | 1.00 | 1.84666 | 23.9 | 21.98 | |
| 24 | −58.442 | 0.15 | | | 22.51 | |
| 25 | 34.725 | 3.64 | 1.56384 | 60.7 | 22.61 | |
| 26 | −358.624 | (variable) | | | 22.26 | |
| 27 | −183.421 | 1.10 | 1.83481 | 42.7 | 21.88 | |
| 28 | 31.077 | 1.43 | | | 21.37 | |
| 29 | 79.321 | 4.38 | 1.80518 | 25.4 | 21.46 | |
| 30 | −27.814 | 1.10 | 1.83481 | 42.7 | 21.55 | |
| 31 | 47.494 | (variable) | | | 21.89 | |
| 32 | 38.310 | 3.53 | 1.51742 | 52.4 | 31.08 | |
| 33 | 67.143 | (variable) | | | 31.15 | |
| Image plane | ∞ | | | | | |

Aspherical data
15th surface

K = 0.00000e+000 A4 = 1.64081e−006 A6 = −4.98940e−009 A8 = −1.19790e−013

Miscellaneous data
Zoom ratio 4.01

| Focal length | 72.49 | 135.49 | 290.86 | 100.36 | 200.68 |
|---|---|---|---|---|---|
| F number | 4.63 | 4.85 | 5.85 | 4.63 | 5.42 |
| Angle of view | 16.62 | 9.07 | 4.25 | 12.16 | 6.15 |
| Image height | 21.64 | 21.64 | 21.64 | 21.64 | 21.64 |
| Lens length | 144.18 | 173.85 | 200.67 | 161.38 | 188.40 |
| BF | 40.50 | 40.50 | 40.50 | 40.50 | 40.50 |
| d7 | 3.54 | 33.20 | 60.03 | 20.74 | 47.76 |
| d12 | 8.72 | 3.80 | 0.74 | 6.40 | 1.94 |
| d16 | 3.09 | 12.27 | 18.93 | 7.71 | 16.67 |
| d19 | 9.08 | 4.82 | 1.22 | 6.78 | 2.29 |
| d26 | 12.70 | 11.59 | 1.13 | 12.45 | 7.97 |

-continued

| Unit mm | | | | | |
|---|---|---|---|---|---|
| d31 | 2.47 | 3.58 | 14.04 | 2.73 | 7.20 |
| d33 | 40.50 | 40.50 | 40.50 | 40.50 | 40.50 |
| Entrance pupil position | 37.26 | 102.88 | 246.98 | 70.18 | 162.33 |
| Exit pupil position | −30.47 | −34.15 | −49.16 | −32.02 | −38.92 |
| Front principal point position | 35.70 | −7.55 | −405.74 | 31.65 | −144.06 |
| Rear principal point position | −31.99 | −94.99 | −250.36 | −59.86 | −160.18 |

Zoom lens unit data

| Unit | Initial surface | Focal length | Lens unit length | Front pricipal point position | Rear principal point position |
|---|---|---|---|---|---|
| 1 | 1 | 116.61 | 18.77 | 3.26 | −9.64 |
| 2 | 8 | −32.48 | 7.21 | 1.59 | −3.21 |
| 3 | 13 | 43.57 | 8.17 | 1.35 | −4.20 |
| 4 | 17 | −38.73 | 4.46 | 0.37 | −2.21 |
| 5 | 20 | 24.12 | 13.93 | 4.56 | −4.74 |
| 6 | 27 | −24.06 | 8.01 | 2.14 | −2.68 |
| 7 | 32 | 165.51 | 3.53 | −2.97 | −5.20 |

Single lens data

| Lens | Initial surface | Focal length |
|---|---|---|
| 1 | 1 | −212.43 |
| 2 | 3 | 1300.54 |
| 3 | 4 | 101.49 |
| 4 | 6 | 331.81 |
| 5 | 8 | −64.97 |
| 6 | 10 | −21.36 |
| 7 | 11 | 31.49 |
| 8 | 13 | −71.69 |
| 9 | 14 | 26.93 |
| 10 | 17 | −22.71 |
| 11 | 18 | 55.31 |
| 12 | 20 | 47.50 |
| 13 | 22 | 38.06 |
| 14 | 23 | −45.83 |
| 15 | 25 | 56.34 |
| 16 | 27 | −31.76 |
| 17 | 29 | 26.05 |
| 18 | 30 | −20.87 |
| 19 | 32 | 165.51 |

Third Numerical Example

Unit mm

Surface data

| No. | r | d | nd | vd | Effective diameter | $\theta_{gF}$ |
|---|---|---|---|---|---|---|
| 1 | ∞ | 0.00 | | | 67.41 | |
| 2 | 152.443 | 5.10 | 1.48749 | 70.2 | 67.41 | |
| 3 | 453.520 | 0.15 | | | 67.03 | |
| 4 | 92.654 | 3.50 | 1.92286 | 18.9 | 66.29 | |
| 5 | 68.395 | 1.00 | 1.76498 | 15.0 | 63.97 | 0.748 |
| 6 | 74.634 | 10.70 | 1.49700 | 81.6 | 63.87 | |
| 7 | 1331.363 | (variable) | | | 62.74 | |
| 8 | 887.378 | 1.40 | 1.72916 | 54.7 | 26.87 | |
| 9 | 58.475 | 3.30 | | | 26.17 | |
| 10 | −53.395 | 1.40 | 1.62280 | 57.1 | 26.15 | |
| 11 | 75.053 | 2.70 | 1.84666 | 23.8 | 26.71 | |
| 12 | −1214.849 | (variable) | | | 26.81 | |
| 13 | −342.979 | 4.80 | 1.43875 | 95.0 | 28.05 | |
| 14 | −33.968 | 1.20 | | | 28.43 | |
| 15 | −34.975 | 2.00 | 1.69680 | 55.5 | 28.26 | |
| 16 | −61.633 | 0.20 | | | 29.18 | |
| 17 | 64.436 | 3.00 | 1.62299 | 58.1 | 29.71 | |
| 18 | 841.030 | 2.50 | | | 29.58 | |
| 19 (aperture stop) | ∞ | (variable) | | | 29.27 | |

-continued

| | | Unit mm | | | |
|---|---|---|---|---|---|
| 20 | −42.941 | 2.90 | 1.60311 | 60.7 | 28.93 |
| 21 | −60.148 | (variable) | | | 29.63 |
| 22 | −573.630 | 3.30 | 1.48749 | 70.2 | 29.89 |
| 23 | −59.065 | 0.15 | | | 29.93 |
| 24 | 439.883 | 1.50 | 1.80518 | 25.4 | 29.41 |
| 25 | 46.846 | 1.30 | | | 28.87 |
| 26 | 89.480 | 3.30 | 1.48749 | 70.2 | 28.92 |
| 27 | −137.450 | 0.15 | | | 29.00 |
| 28 | 42.901 | 4.00 | 1.66672 | 48.3 | 28.93 |
| 29 | −970.564 | (variable) | | | 28.53 |
| 30 | −824.208 | 1.45 | 1.80610 | 41.0 | 21.70 |
| 31 | 32.805 | 0.33 | | | 20.78 |
| 32 | 32.322 | 4.30 | 1.72825 | 28.5 | 20.79 |
| 33 | −124.055 | 1.45 | 1.77250 | 49.6 | 20.19 |
| 34 | 51.881 | (variable) | | | 19.46 |
| Image plane | ∞ | | | | |

| Miscellaneous data Zoom ratio 3.75 | | | | | |
|---|---|---|---|---|---|
| Focal length | 104.16 | 166.66 | 391.00 | 125.47 | 259.76 |
| F number | 4.60 | 5.20 | 5.80 | 5.20 | 5.80 |
| Angle of view | 11.73 | 7.40 | 3.17 | 9.78 | 4.76 |
| Image height | 21.64 | 21.64 | 21.64 | 21.64 | 21.64 |
| Lens length | 221.48 | 252.31 | 300.68 | 233.41 | 279.42 |
| BF | 70.65 | 87.69 | 113.37 | 77.35 | 103.45 |
| d7 | 7.47 | 38.30 | 86.68 | 19.40 | 65.42 |
| d12 | 28.17 | 21.94 | 10.09 | 25.27 | 16.65 |
| d19 | 3.73 | 8.19 | 8.35 | 6.22 | 9.25 |
| d21 | 23.06 | 12.45 | 14.14 | 18.32 | 7.53 |
| d29 | 21.31 | 16.65 | 0.99 | 19.76 | 10.05 |
| d34 | 70.65 | 87.69 | 113.37 | 77.35 | 103.45 |
| Entrance pupil position | 63.67 | 136.51 | 412.60 | 87.04 | 251.53 |
| Exit pupil position | −38.98 | −34.21 | −33.11 | −37.29 | −30.28 |
| Front principal point position | 68.87 | 75.32 | −240.16 | 75.19 | 6.72 |
| Rear principal point position | −33.51 | −78.97 | −277.63 | −48.11 | −156.31 |

| Zoom lens unit data | | | | | |
|---|---|---|---|---|---|
| Unit | Initial surface | Focal length | Lens unit length | Front pricipal point position | Rear principal point position |
| 1 | 1 | 167.88 | 20.45 | −1.08 | −14.04 |
| 2 | 8 | −50.43 | 8.80 | 1.95 | −4.45 |
| 3 | 13 | 81.95 | 13.70 | 5.73 | −4.54 |
| 4 | 20 | −265.74 | 2.90 | −4.82 | −6.75 |
| 5 | 22 | 56.95 | 13.70 | 7.41 | −1.84 |
| 6 | 30 | −54.45 | 7.53 | 3.34 | −1.03 |

| Single lens data | | |
|---|---|---|
| Lens | Initial surface | Focal length |
| 1 | 1 | 468.45 |
| 2 | 4 | −304.11 |
| 3 | 5 | 999.99 |
| 4 | 6 | 158.64 |
| 5 | 8 | −85.91 |
| 6 | 10 | −49.89 |
| 7 | 11 | 83.57 |
| 8 | 13 | 85.53 |
| 9 | 15 | −119.74 |
| 10 | 17 | 111.85 |
| 11 | 20 | −265.74 |
| 12 | 22 | 134.79 |
| 13 | 24 | −65.23 |
| 14 | 26 | 111.71 |
| 15 | 28 | 61.72 |
| 16 | 30 | −39.11 |
| 17 | 32 | 35.62 |
| 18 | 33 | −47.19 |

Fourth Numerical Example

| | | Unit mm | | | | |
|---|---|---|---|---|---|---|
| | | Surface data | | | | |
| No. | r | d | nd | vd | Effective diameter | $\theta_{gF}$ |
| 1 | ∞ | 0.00 | | | 67.41 | |
| 2 | 81.794 | 7.10 | 1.51823 | 59.0 | 67.41 | |
| 3 | 286.309 | 0.15 | | | 66.87 | |
| 4 | 91.000 | 3.50 | 1.94595 | 18.0 | 65.43 | 0.728 |
| 5 | 50.074 | 0.00 | | | 61.17 | |
| 6 | 50.074 | 4.45 | 1.65696 | 19.7 | 61.17 | |
| 7 | 77.991 | 0.00 | | | 61.08 | |
| 8 | 77.991 | 8.70 | 1.51742 | 52.4 | 61.08 | |
| 9 | 1000.000 | (variable) | | | 60.06 | |
| 10 | −109.636 | 1.40 | 1.72916 | 54.7 | 27.16 | |
| 11 | 61.974 | 3.30 | | | 26.52 | |
| 12 | −69.352 | 1.40 | 1.62280 | 57.1 | 26.53 | |
| 13 | 104.877 | 2.70 | 1.84666 | 23.8 | 27.09 | |
| 14 | −162.959 | (variable) | | | 27.23 | |
| 15 | 3474.692 | 4.80 | 1.43875 | 95.0 | 28.77 | |
| 16 | −82.584 | 1.20 | | | 29.21 | |
| 17 | −46.083 | 2.00 | 1.69680 | 55.5 | 29.21 | |
| 18 | −64.021 | 0.20 | | | 29.95 | |
| 19 | 85.455 | 3.00 | 1.62299 | 58.1 | 30.45 | |
| 20 | 254.995 | 2.50 | | | 30.35 | |
| 21 (aperture stop) | ∞ | (variable) | | | 30.35 | |
| 22 | 959.956 | 3.30 | 1.48749 | 70.2 | 30.35 | |
| 23 | −76.555 | 0.15 | | | 30.33 | |
| 24 | 309.901 | 1.50 | 1.80518 | 25.4 | 29.91 | |
| 25 | 46.588 | 1.30 | | | 29.40 | |
| 26 | 66.262 | 3.30 | 1.48749 | 70.2 | 29.57 | |
| 27 | −390.093 | 0.15 | | | 29.62 | |
| 28 | 52.049 | 4.00 | 1.66672 | 48.3 | 29.66 | |
| 29 | −413.594 | (variable) | | | 29.30 | |
| 30 | 476.334 | 1.45 | 1.80610 | 41.0 | 20.36 | |
| 31 | 33.145 | 0.33 | | | 19.57 | |
| 32 | 32.955 | 4.30 | 1.72825 | 28.5 | 19.56 | |
| 33 | −183.753 | 1.45 | 1.77250 | 49.6 | 18.87 | |
| 34 | 50.021 | (variable) | | | 18.91 | |
| Image plane | ∞ | | | | | |

| Miscellaneous data | | | | | |
|---|---|---|---|---|---|
| Zoom ratio 3.75 | | | | | |
| Focal length | 104.16 | 166.66 | 391.00 | 124.36 | 269.58 |
| F number | 4.60 | 5.20 | 5.80 | 5.20 | 5.80 |
| Angle of view | 11.73 | 7.40 | 3.17 | 9.87 | 4.59 |
| Image height | 21.64 | 21.64 | 21.64 | 21.64 | 21.64 |
| Lens length | 219.48 | 246.09 | 279.77 | 229.14 | 268.68 |
| BF | 58.30 | 84.63 | 106.00 | 70.68 | 102.05 |
| d9 | 6.38 | 32.99 | 66.68 | 16.04 | 55.58 |
| d14 | 34.87 | 37.94 | 4.91 | 37.79 | 29.45 |
| d21 | 18.39 | 0.35 | 31.10 | 8.20 | 1.53 |
| d29 | 33.90 | 22.55 | 3.47 | 28.80 | 12.45 |
| d34 | 58.30 | 84.63 | 106.00 | 70.68 | 102.05 |
| Entrance pupil position | 73.62 | 166.86 | 338.21 | 101.47 | 313.98 |
| Exit pupil position | −35.73 | −23.66 | −38.99 | −29.57 | −20.00 |
| Front principal point position | 62.40 | 77.03 | −325.21 | 71.57 | 11.90 |
| Rear principal point position | −45.86 | −82.03 | −285.00 | −53.68 | −167.54 |

| Zoom lens unit data | | | | | |
|---|---|---|---|---|---|
| Unit | Initial surface | Focal length | Lens unit length | Front pricipal point position | Rear principal point position |
| 1 | 1 | 140.47 | 23.90 | −2.86 | −17.54 |
| 2 | 10 | −50.34 | 8.80 | 0.09 | −6.45 |
| 3 | 15 | 159.78 | 13.70 | 5.86 | −4.41 |
| 4 | 22 | 65.22 | 13.70 | 7.17 | −2.13 |
| 5 | 30 | −61.87 | 7.53 | 3.93 | −0.46 |

-continued

Unit mm

Single lens data

| Lens | Initial surface | Focal length |
|------|-----------------|--------------|
| 1  | 1  | 218.37  |
| 2  | 4  | −122.81 |
| 3  | 6  | 200.28  |
| 4  | 8  | 162.96  |
| 5  | 10 | −54.11  |
| 6  | 12 | −66.82  |
| 7  | 13 | 75.72   |
| 8  | 15 | 183.93  |
| 9  | 17 | −247.36 |
| 10 | 19 | 204.92  |
| 11 | 22 | 145.59  |
| 12 | 24 | −68.27  |
| 13 | 26 | 116.46  |
| 14 | 28 | 69.58   |
| 15 | 30 | −44.26  |
| 16 | 32 | 38.69   |
| 17 | 33 | −50.76  |

Table 1 shows the relationship between each of the aforementioned conditional expressions according to the present invention and each of the numerical examples.

TABLE 1

|  | First Numerical Example | Second Numerical Example | Third Numerical Example | Fourth Numerical Example |
|---|---|---|---|---|
| Conditional expression (1) | 610 | 1038 | 571 | 166 |
| Conditional expression (2) | −4.6 | −5.9 | −6.6 | −3.4 |
| Conditional expression (3) | 3.0 | 3.9 | 4.3 | 2.9 |
| Conditional expression (4) | 1.04 | 0.93 | 1.12 | 1.17 |
| Conditional expression (5) | 1.23 | 1.25 | 1.20 | 1.44 |
| Conditional expression (6) | −3.68 | −3.59 | −3.32 | −2.79 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-249337 filed Nov. 15, 2011, which is hereby incorporated by reference herein in its entirety.

What is claimed is:

1. A zoom lens comprising, from an object side:
a first lens unit having a positive refractive power;
a second lens unit having a negative refractive power; and
a subsequent lens unit,
wherein the first lens unit includes an optical element composed of an anomalous dispersion optical material, a positive lens, and a negative lens, and
wherein the following conditional expressions are satisfied $$100 < \frac{vdp * fp}{\Delta\theta_{g,Fp} * \sqrt{fw \times ft}} < 1200 \quad (1)$$

$$-10.0 < (R2n + R1n)/(R2n - R1n) < -3.3 \quad (2)$$

$$2.8 < vdp1/vdn < 6.0, \quad (3)$$

where fw is a focal length of the entire zoom lens at a wide angle end,
ft is a focal length of the entire zoom lens at a telephoto end,
fp is a focal length of the optical element composed of the anomalous dispersion optical material,
$\theta_{g,Fp}$ is a partial dispersion ratio of the anomalous dispersion optical material,
$\Delta\theta_{g,Fp}$ is $\theta_{g,Fp} - (-0.001682 \times vdp + 0.6438)$,
vdp is an Abbe number of the optical element composed of the anomalous dispersion optical material,
vdp1 is an Abbe number of a positive lens having the highest power in the first lens unit,
vdn is an Abbe number of a negative lens having the highest power in the first lens unit,
R1n is a radius of curvature of an object-side surface of the negative lens having the highest power in the first lens unit, and
R2n is a radius of curvature of an image-side surface of the negative lens having the highest power in the first lens unit.

2. The zoom lens according to claim 1,
wherein the positive lens having the highest power in the first lens unit satisfies the following conditional expression $$0.81 < (R2p+R1p)/(R2p-R1p) < 1.20 \quad (4),$$

where R1p is a radius of curvature of an object-side surface of the positive lens having the highest power in the first lens unit, and
R2p is a radius of curvature of an image-side surface of the positive lens having the highest power in the first lens unit.

3. The zoom lens according to claim 1,
wherein the first lens unit satisfies the following conditional expression $$1.00 < \sqrt{(fw \cdot ft)}/f1 < 1.50 \quad (5),$$

where f1 is a focal length of the first lens unit.

4. The zoom lens according to claim 1,
wherein the first and second lens units satisfy the following conditional expression $$-4.0 < f1/f2 < -2.0 \qquad (6),$$

where f2 is a focal length of the second lens unit.

* * * * *